No. 658,499. Patented Sept. 25, 1900.
P. CUNNINGHAM.
UNIVERSAL JOINT.
(Application filed Apr. 23, 1900.)

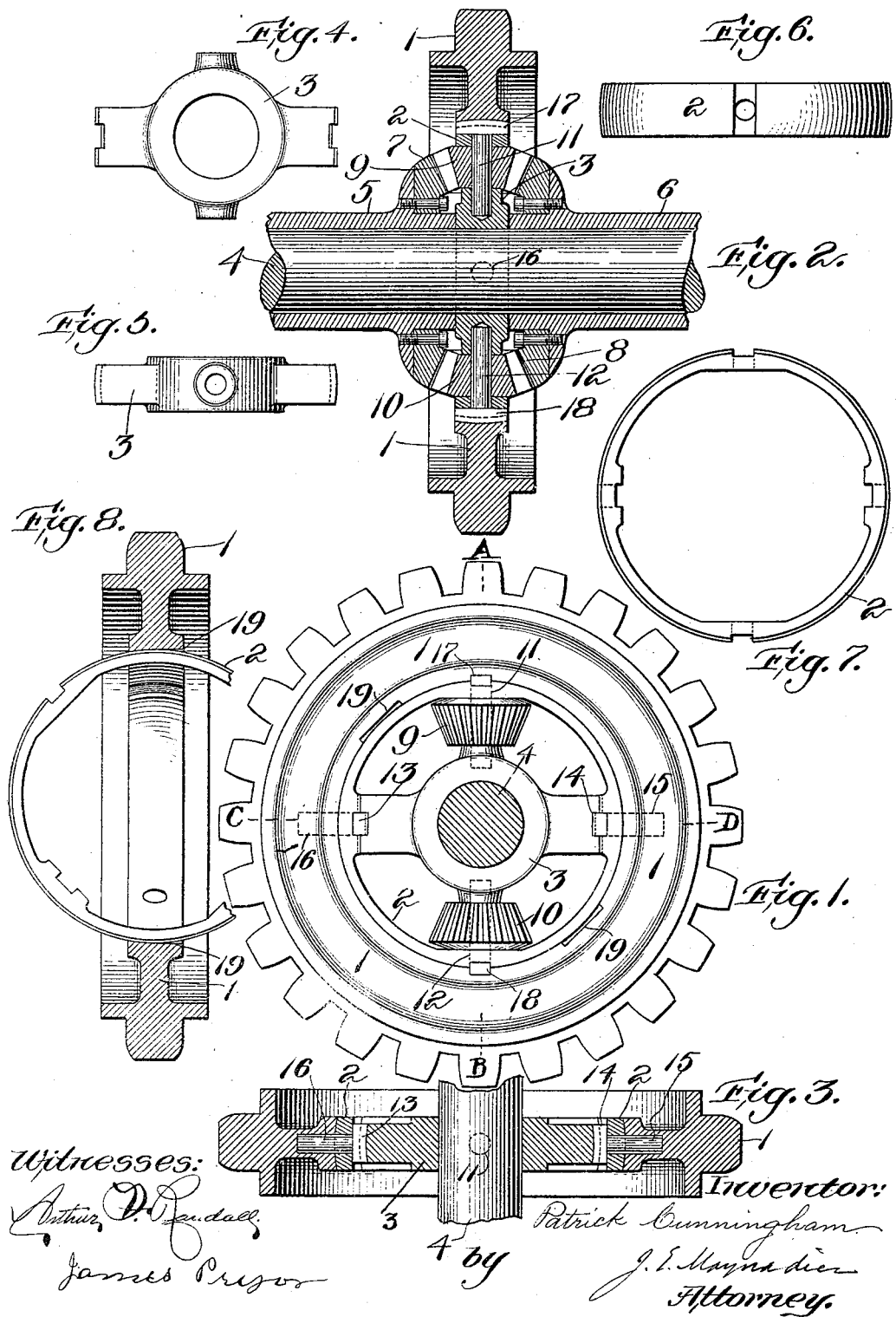

(No Model.) 2 Sheets—Sheet 2.

Witnesses:
Arthur J. Randall
James Pryor

Inventor:
Patrick Cunningham
by J. E. Magruder
Attorney.

United States Patent Office.

PATRICK CUNNINGHAM, OF NEW BEDFORD, MASSACHUSETTS, ASSIGNOR OF THREE-FOURTHS TO FRED D. STANLEY, OF SAME PLACE, AND WILLIAM A. WHITTLESEY, OF PITTSFIELD, MASSACHUSETTS.

UNIVERSAL JOINT.

SPECIFICATION forming part of Letters Patent No. 658,499, dated September 25, 1900.

Application filed April 23, 1900. Serial No. 13,877. (No model.)

*To all whom it may concern:*

Be it known that I, PATRICK CUNNINGHAM, of New Bedford, in the county of Bristol and State of Massachusetts, have invented an Improved Universal Joint, of which the following is a specification, reference being had to the accompanying drawings, in which—

Figure 9:
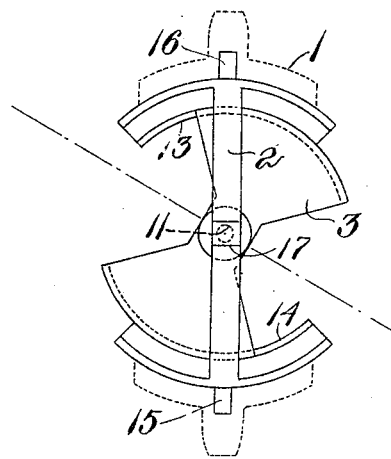
Figure 10:
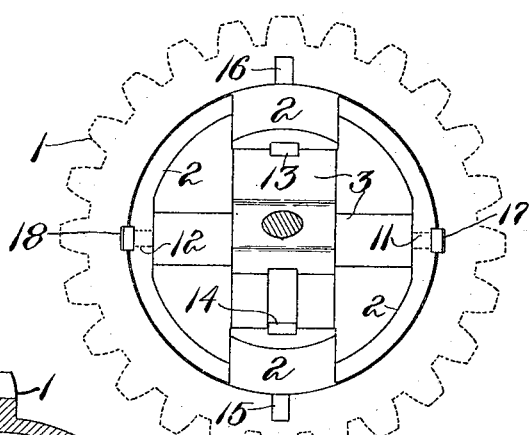
Figure 11:
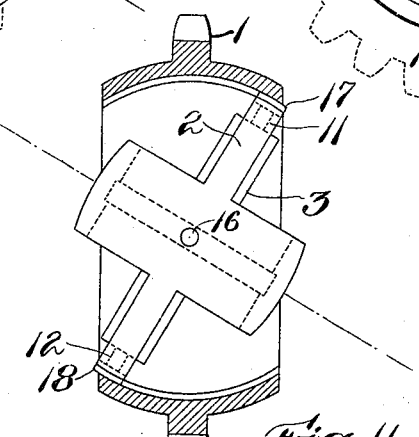
Figure 12:
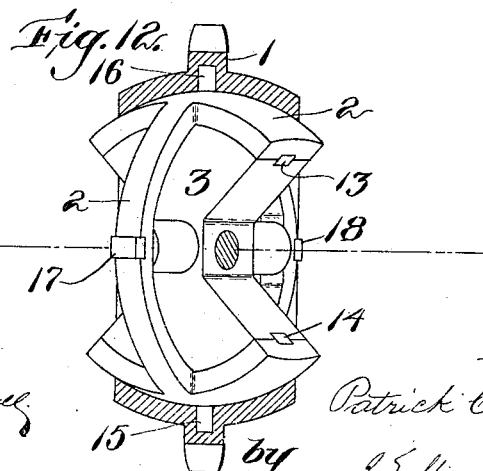

Figure 1 is an elevation of one form of my universal joint. Fig. 2 is a section on line A A of Fig. 1, showing also sleeve-shafts, which are not shown in Fig. 1. Fig. 3 is a section on line C D of Fig. 1. Figs. 4 and 5 are elevations of the inner member of my universal joint. Figs. 6 and 7 are elevations of the intermediate member. Fig. 8 is a section illustrating how the intermediate member and the outer member are best assembled, as explained below. Figs. 9, 10, 11, and 12 are diagrams explained below.

My invention is a universal joint made up of an outer member provided with internal keyways diametrically opposite and trunnion-sockets diametrically opposite and at right angles to the keyways, an intermediate member provided with external keyways complementary to the internal keyways of the outer member and with external trunnions which enter the trunnion-sockets of the outer member, and also with internal keyways diametrically opposite and at right angles to its external keyways, and with internal trunnions diametrically opposite and at right angles with its external trunnions, and an inner member with external keyways complementary to the internal keyways of the intermediate member and with trunnion-sockets for the internal trunnions of the intermediate member; or, more briefly, my new universal joint consists of three members interconnected by two pairs of keys and ways and two pairs of trunnions, the outer member being connected with the intermediate member by one pair of keys and keyways and also by one pair of trunnions and the inner member being connected with the intermediate member by a second pair of keys and keyways ninety degrees from the first pair, and also by a second pair of trunnions ninety degrees from the first pair.

In the drawings I have shown the outer member 1 as a sprocket-wheel, to which power may be applied or from which power may be transmitted through a sprocket-chain; but a gear, pulley, or the like may obviously be used. I have also shown the inner member 3 as a hub, which may be fast on shaft 4, but which I have shown connected to sleeve-shafts 5 and 6 by means of beveled gears 7 and 8 and beveled pinions 9 and 10; but whatever be the form of the outer member 1 or the inner member 3 power applied to either will be transmitted to the other, and the axis of the inner member 3 need not coincide with the axis of the outer member 1.

The intermediate member 2 is held to the inner member 3 by means of two trunnions 11 and 12, (shown in full lines in Fig. 2 and in dotted lines in Fig. 1,) so that both members 2 and 3 may move relatively on an axis coincident with the axis of trunnions 11 and 12. Members 2 and 3 are also connected by keys 13 and 14, which fit keyways, one across the arms of the inner member 3 and the other across the enlarged portion shown on the right and left of member 2 in Fig. 7. The surface across the end of each of the arms of inner member 3 is cylindrical, its axis coinciding with the axes of the trunnions 11 and 12, and the inner surface of each enlarged portion shown on the right and left of the intermediate member 2 in Figs. 3 and 7 is also cylindrical, so that the inner member 3 is free to move relatively to the intermediate member 2 on trunnions 11 and 12 as an axis, as clearly shown in diagrams Figs. 9 and 10; but while the inner member 3 can move freely on axis of trunnions 11 and 12 without moving member 2 members 2 and 3 must always move together on their central axis coincident with the axis of shaft 4, because the keys 13 and 14 connect members 2 and 3 rigidly, so far as motion on that axis is concerned. In the diagrams Figs. 9 and 10 I have shown the cylindrical portion of members 2 and 3, which fit one another, much extended, but that is for clearness only, as in practice the motion of member 3 relatively to member 2 on trunnions 11 and 12 as an axis is rarely so much, as is shown in the diagrams Figs. 9 and 10.

Intermediate member 2 is held to outer member 1 by trunnions 15 and 16, and the outer surface of member 2 is spherical and fits the spherical inner surface of member 1, so that member 2 is free to move relatively to member 1 on trunnions 15 and 16 as an axis; but the keys 17 and 18 prevent relative motion of members 1 and 2 on an axis coincident with the axis of shaft 4. This will be clear from diagram Figs. 11 and 12, in which I have exaggerated the relative motions of members 1 and 2 for clearness.

The keys 13 and 14 are preferably made as heads to the trunnions 15 and 16 and the keys 17 and 18 as heads to trunnions 11 and 12.

The keys and keyways connecting members 2 and 3, as above described, are the best form of a spline for so connecting members 2 and 3 as to allow relative motion on one axis, but prevent relative motion on another axis, and so of the keys and keyways connecting members 1 and 2, so as to allow relative motion on one axis, but prevent relative motion on another axis.

While member 1 may be made in two parts bolted together after members 2 and 3 have been put in place, it is much better to make member 1 as one casting and cut it away to form gates, as shown at 19, Figs. 1 and 8, when member 2 can be inserted crosswise of member 1, as shown in Fig. 8, and after member 2 has been thus inserted it is an easy matter to bring the holes for trunnions 15 and 16 into line and insert trunnions 15 and 16, thus connecting members 1 and 2. Then swing member 2 on trunnions 15 and 16 as an axis far enough out of the plane of member 1, place member 3 in member 2, and insert trunnions 11 and 12. Then all three members can be readily brought into the same plane.

It will now be clear that my invention is a universal joint composed of three members each splined to the next, so that the intermediate member is rigid with the outer and inner members so far as motion on a central axis is concerned, yet the intermediate member can move relatively to the outer member on an axis at right angles to the central axis and the inner member can move relatively to the intermediate member on an axis at right angles to the other two axes. It will also be clear that trunnions connecting the outer member with the intermediate member and trunnions connecting the intermediate member with the inner member are not strictly essential, although these trunnions are in practice necessary to insure smooth and easy action, especially when my universal joint is subject to very considerable strains. For the best results it is also necessary to make the outer surface of the intermediate member spherical about the keys 17 and 18 and about the trunnions 15 and 16 and the inner surface of the intermediate member about the keys 13 and 14 cylindrical to fit a cylindrical outer surface of the inner member about those keys.

The operation is as follows: Assuming that power is applied to revolve the outer member, so long as the axis of the inner member coincides with the axis of the outer member there will be no motion of either member relatively to any of the other members; but if the central axis or the axis of shaft 4 be tilted on the axis of the dotted circle 16 (shown in Fig. 2) the inner member will tilt and carry with it the intermediate member and the keys 17 and 18 will move in their keyways in the outer member. So if the central axis be tilted on the axis of the dotted circle 11 (shown in Fig. 3) the keyways on the inner member will move on the keys 13 and 14 carried by the intermediate member.

What I claim as my invention is—

1. The universal joint above described comprising an outer member with internal keyways one hundred and eighty degrees apart; an intermediate member with external keyways complementary to the internal keyways of the outer member, and also with internal keyways, ninety degrees from its external keyways; an inner member with external keyways complementary to the internal keyways of the intermediate member; keys for the internal keyways of the outer member and the external keyways of the intermediate member; and other keys for the internal keyways of the intermediate member and the external keyways of the inner member.

2. In a universal joint, an outer member; an intermediate member; an inner member; a spline connecting the outer member with the intermediate member; and another spline connecting the intermediate member with the inner member; all substantially as described.

3. In a universal joint an outer member with a spherical inner surface, and an intermediate member with a spherical outer surface, said outer member having gates as 19 to admit placing the intermediate member in the outer member substantially as and for the purpose specified.

PATRICK CUNNINGHAM.

Witnesses:
J. E. MAYNADIER,
ARTHUR F. RANDALL.